Aug. 14, 1962 M. A. CAMPBELL 3,049,216
HOPPER FED CONVEYOR
Original Filed Feb. 7, 1957 5 Sheets-Sheet 1

INVENTOR.
MILFORD A. CAMPBELL
BY
ATTORNEY

Aug. 14, 1962 M. A. CAMPBELL 3,049,216
HOPPER FED CONVEYOR
Original Filed Feb. 7, 1957 5 Sheets-Sheet 2

INVENTOR.
MILFORD A. CAMPBELL
BY
ATTORNEY

INVENTOR.
MILFORD A. CAMPBELL
BY J.D. Murray
ATTORNEY

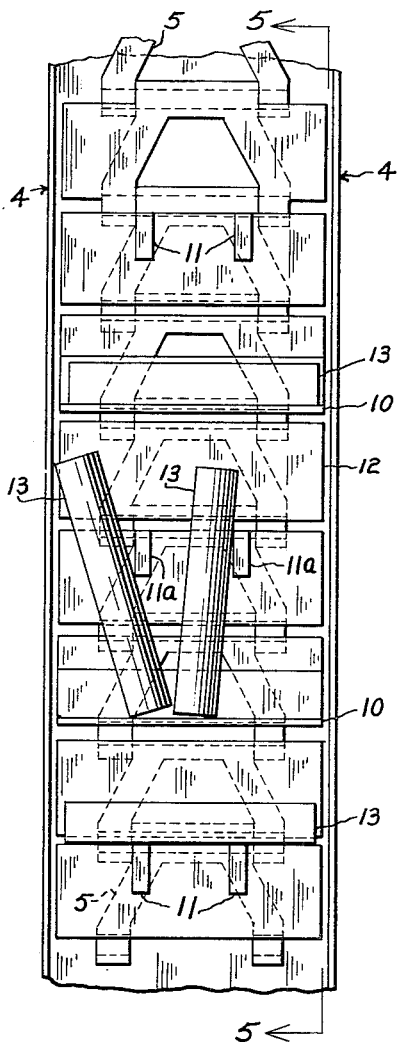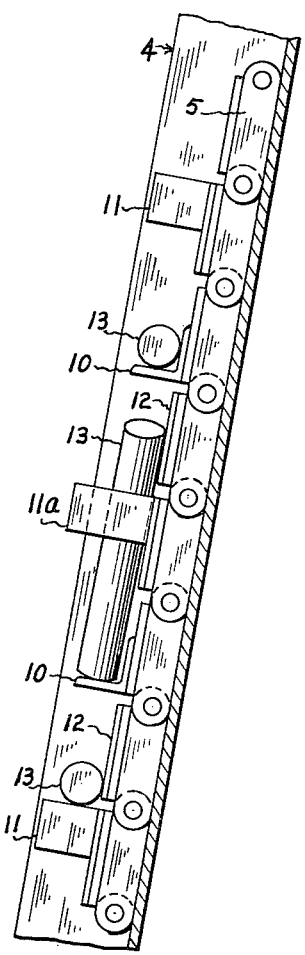

Aug. 14, 1962   M. A. CAMPBELL   3,049,216
HOPPER FED CONVEYOR
Original Filed Feb. 7, 1957   5 Sheets-Sheet 5
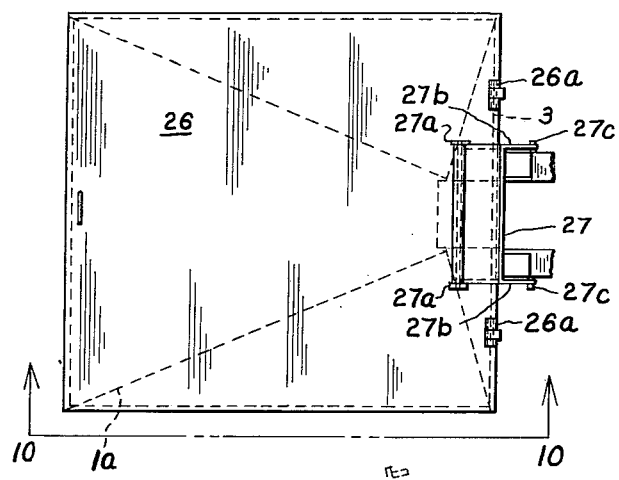
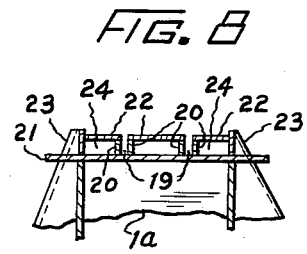
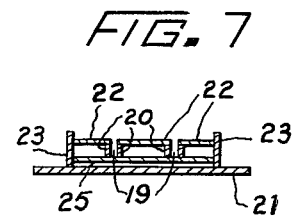
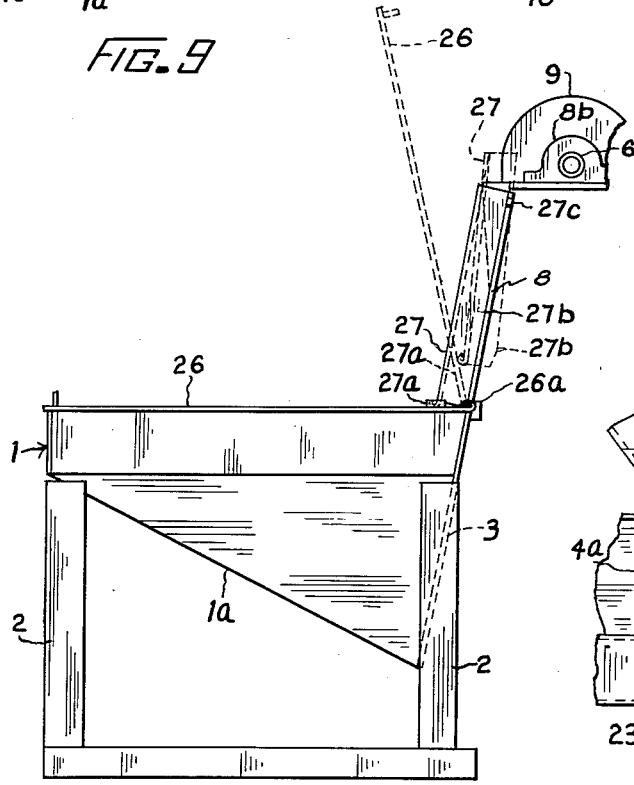
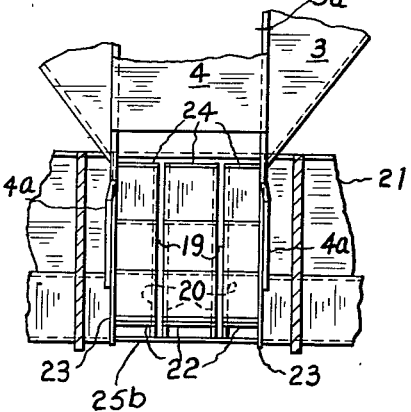
INVENTOR.
MILFORD A. CAMPBELL
BY
ATTORNEY United States Patent Office 3,049,216
Patented Aug. 14, 1962

3,049,216
HOPPER FED CONVEYOR
Milford A. Campbell, 17225 MacArthur, Detroit, Mich.
Original application Feb. 7, 1957, Ser. No. 638,805, now Patent No. 2,930,473, dated Mar. 29, 1960. Divided and this application Feb. 23, 1960, Ser. No. 10,180
7 Claims. (Cl. 198—33)

This invention relates to mechanisms for progressively delivering workpieces upwardly from a hopper, and is a division of the subject matter of my patent on Hopper Fed Mechanism for Orienting Workpieces, No. 2,930,473, issued March 29, 1960.

An object of the invention is to adapt a conveyor to upwardly deliver elongated workpieces from a hopper, and to equip the conveyor with such pick-up devices as will assure a substantially constant rate of such delivery.

Another object is to provide an opening at the bottom of the hopper to afford passage of said conveyor and pick-up devices upwardly into the hopper.

Another object is to dispose a housing at said opening and adapt said housing to afford passage to said conveyor and pick-up devices while restraining the hopper contents from downward escape.

Still another object is to provide a lid surmounting the hopper and pivotal at an upper edge thereof, and a cover confronting an upwardly traveling portion of the conveyor, said cover being pivotally installed upon the lid and slidable relative to said portion of the conveyor when the lid is raised or lowered.

These and various other objects are attained by the construction hereinafter described and illustrated in the accompanying drawings, wherein:

FIG. 4 is a fragmentary elevational view of a portion of the upwardly traveling span of the conveyor, showing various lodgments of workpieces on the pick-up devices, and showing a channel member which guides the conveyor.

FIG. 5 is a vertical sectional view of the same, taken on the line 5—5 of FIG. 4.

FIG. 6 is a fragmentary sectional view on the line 6—6 of FIG. 2 showing a provision beneath the hopper to prevent jamming of the machine by workpieces falling from the hopper.

FIG. 7 is a fragmentary sectional view on the line 7—7 of FIG. 2 further illustrating said provision.

FIG. 8 is a fragmentary sectional view on the line 8—8 of FIG. 2 still further illustrating said provision.

FIG. 9 is a partial plan view on a reduced scale, showing a lid surmounting said hopper and a cover enclosing said conveyor.

FIG. 10 is a side elevational view of the same taken on line 10—10 of FIG. 9.

Figure 1:
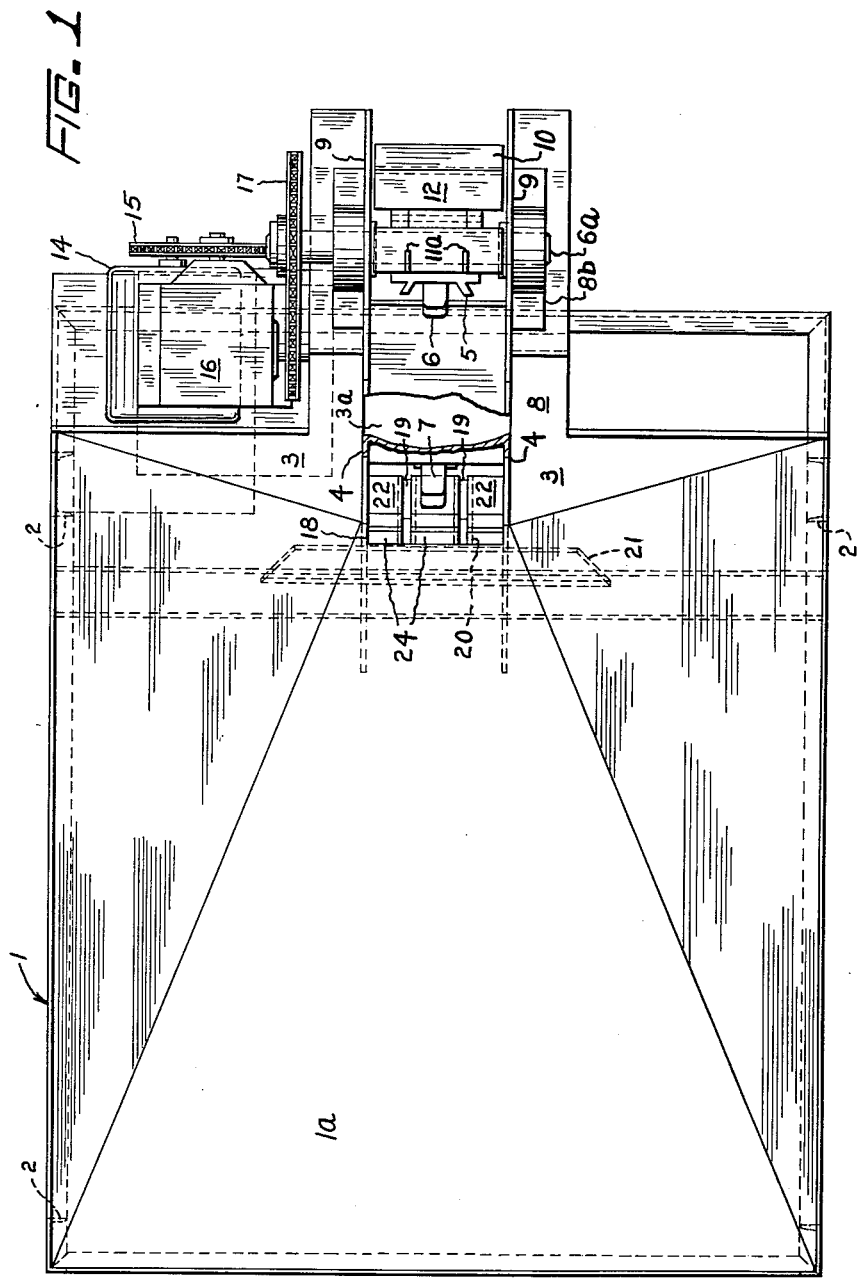
FIG. 1 is a top plan view of the machine, omitting the uptraveling span of the conveyor.
Figure 2:
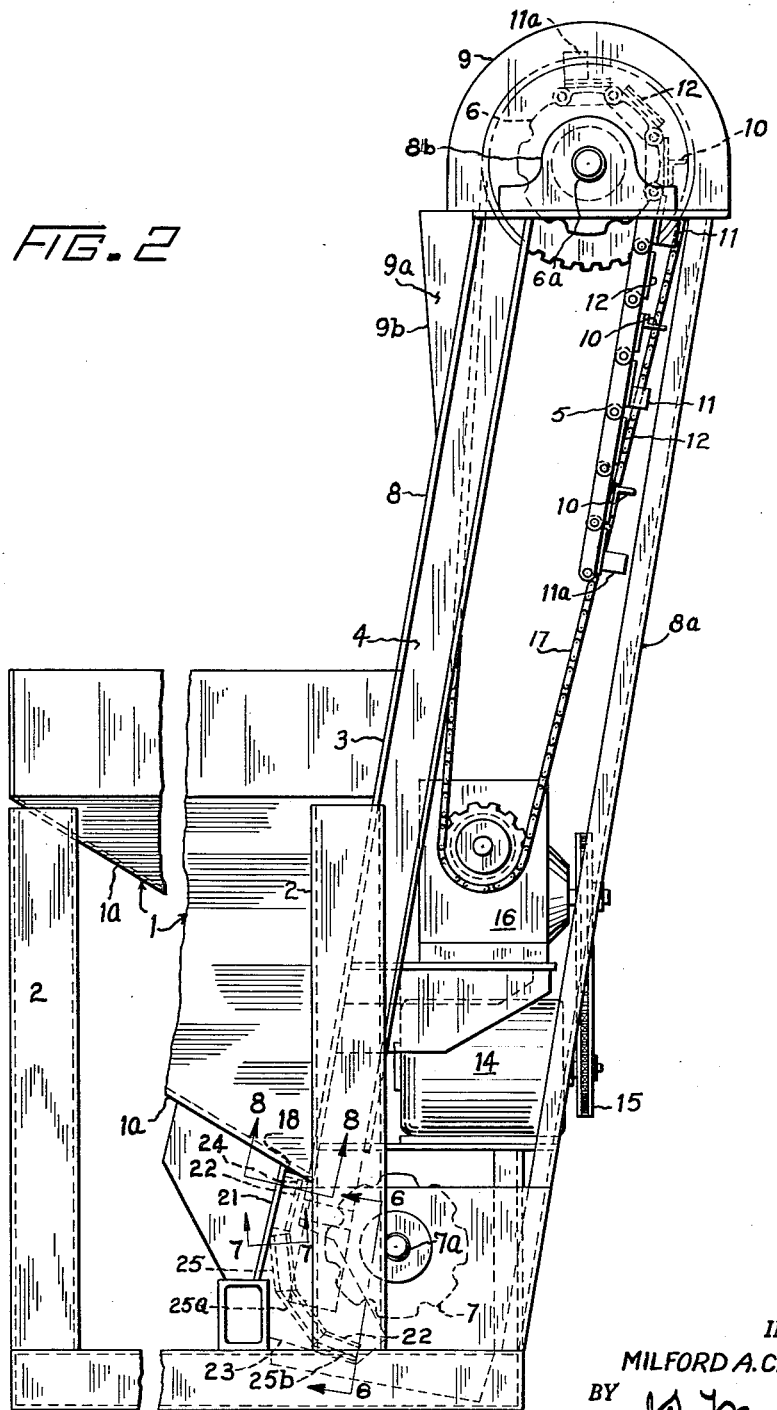
FIG. 2 is a view of the same in side elevation.
Figure 3:
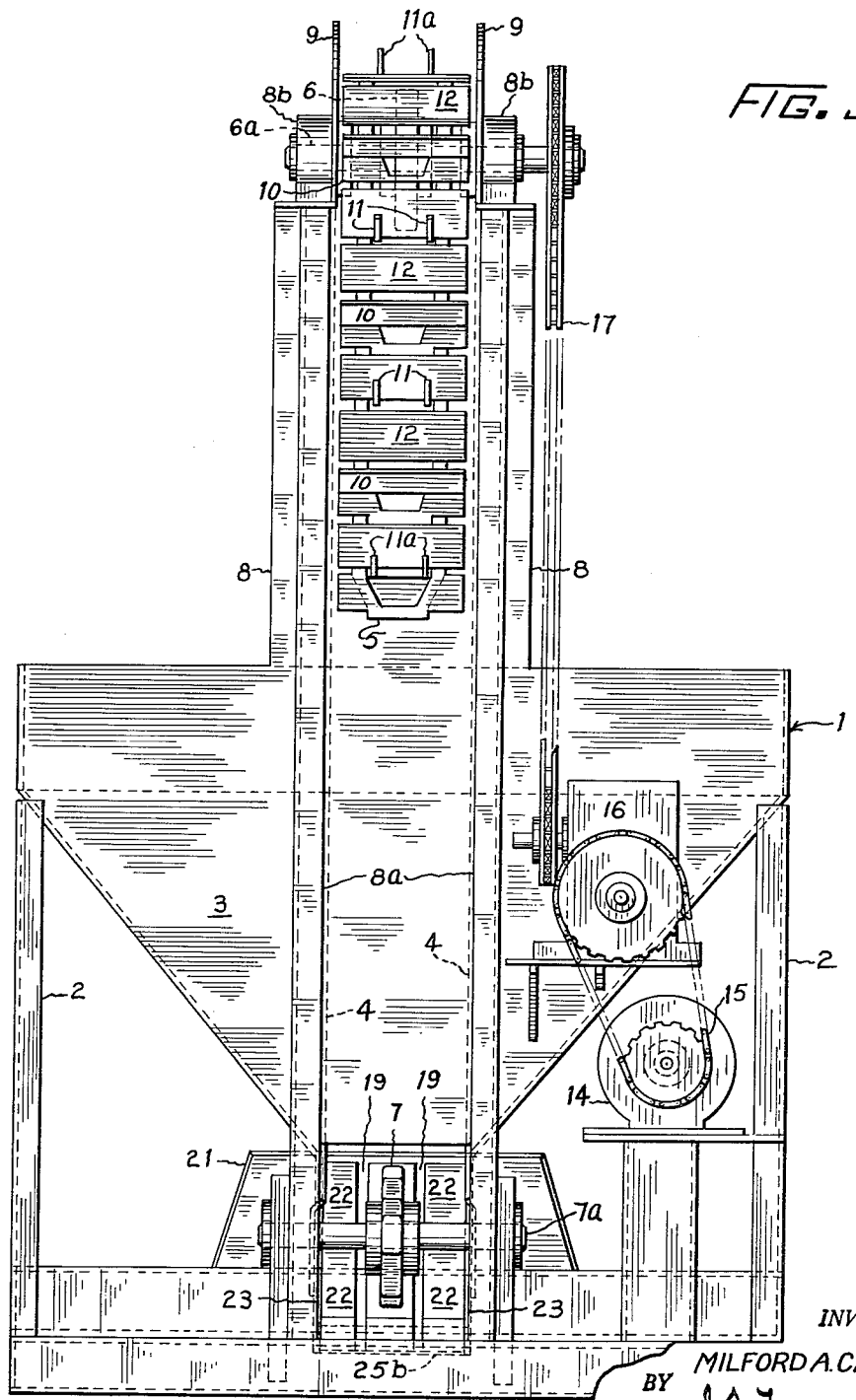
FIG. 3 is a rear view of the same.

In these views, the reference character 1 designates a hopper surmounting legs 2 and having its bottom 1a downwardly inclined toward a rear wall 3. Such wall is centrally slotted from top to bottom thereof, its slot 3a opening into an elongated channel member 4 affixed to said wall and thus forming an upwardly elongated rearward extension of the hopper. Within such extension is housed the upwardly traveling span of an elongated endless conveyor including a flexible chain 5. Such chain is mounted on upper and lower sprocket wheels 6 and 7 fixed on shafts 6a and 7a. The uppermost of said wheels is sufficiently elevated above the hopper to afford a required lift of the pieces to be conveyed. The lower wheel is in suitable rearward proximity to the hopper bottom. An upward extension 8 of the hopper wall 3 is slotted to upwardly continue the slot 3a and the channel member 4 has an upper portion maintaining the described relation to said slot. Said extension 8 forms part of a pedestal 8a surmounted by bearings 8b for the shaft 6a. Further surmounting the pedestal 8a are a pair of spaced substantially semicircular plates 9 between which the conveyor travels rearwardly over the upper sprocket wheel. It is preferred to so offset the upper wheel rearwardly from the lower one as to afford the conveyor a moderate rearward incline, as about ten degrees, in extending upwardly, the hopper wall 3 conforming to such incline.

The conveyor further comprises a series of pick-up devices secured to the outer face of the chain 5. Each such device incorporates three links of the chain and includes a shelf 10 having a slight clearance at its ends from the member 4, a pair of horizontally spaced lugs 11 spaced from said shelf in the direction of conveyor travel, and a plate 12 adjoining and preceding said lugs in said direction of travel. The distance between the shelves 10 of adjoining pick-up devices preferably somewhat exceeds the length of the work-pieces 13 to be conveyed. The distance between the flanges of the channel member 4 is slightly greater than the workpiece length, and the spacing of the paired lugs 11 from each other and from the flanges 4 permits lodging of a workpiece in any of such spaces, and affords a material inclination of the pieces so lodged. Also, pieces may lodge in a transverse relation to conveyor travel on any of the shelves 10 or on any pair of lugs 11, the various described lodgments being illustrated in FIGS. 4 and 5.

This adaptation of the pick-up devices to variously receive the pieces achieves a much steadier and more reliable feed than can be established by devices lacking such diversity of lodgment. Efficiency of the described devices is such that they will continue to steadily withdraw pieces from the hopper until the latter is completely empty. It has been found that an increased efficiency results from employing relatively long paired lugs 11a at uniformly spaced points along the conveyor, as for example as elements of every fourth or fifth pick-up device. These relatively long lugs loosen up the hopper contents confronted by the conveyor and thus avoid such packing of the workpieces as might otherwise hold them clear of the conveyor.

Beneath said semi-circular plates 9, a pair of triangular plates 9a rigidly flank the channel member. The forward edges 9b of the latter plates are so inclined as to engage and dislodge any workpieces that may project angularly from the pick-up devices beyond the margins of said channel member.

While the conveyor may be variously driven, it is preferred to install an electric motor 14 at the rear of the machine, and a speed-reducing drive from such motor to the shaft 6a through a chain 15, gears housed at 16, and another chain 17.

To afford upward passage for the longer lugs 11a it is necessary to form an opening 18 in the hopper bottom confronting the channel 4, such opening being elongated transversely to the direction of conveyor travel. A housing is disposed beneath and partially obstructs said opening leaving only spaced channels 19 through which said lugs may travel as best shown in FIGS. 6, 7, and 8.

Such channels are formed by ribs 20 rigidly affixed to a supporting member 21 for the hopper. Except for said channels, the ribs are bridged by plates 22, which are in part supported by vertical side members 23 of said housing. The latter are fixed, as by welding, to said supporting member 21 for the hopper and to downward, mutually oppositely offset extensions 4a of said channel member 4. Said ribs upwardly terminate immediately beneath the opening 18 and are surmounted by plates 24.

The side members 23 support three plates, 25, 25a, and 25b, disposed parallel to the axis of the lower sprocket wheel 7, and arranged end to end in an approximate arc centered at such axis. Said plates carry extensions of the channels 19 to a point substantially beneath said sprocket wheel 7, so that when one shelf member 10 is traveling upwardly from the opening 33, the next shelf has moved into position between the side members 23 and within the arcuate extent said plates. Thus, while a workpiece may fall into the housing between said arcuate surface and the conveyor chain after a shelf 10 emerges upwardly therefrom, the descent of such workpiece is confined within the housing so that it must be engaged by the next shelf and carried upwardly, thus preventing escape of such workpiece, or jamming of the machine. It will be apparent that the plates 22 and the rib-surmounting plates 24 prevent workpieces from lodging between the ribs 20.

For the safety of the operators, and to prevent foreign objects from falling or being thrown into the hopper and conveyor, as the latter travels upwardly, it is preferred to provide a lid 26 (FIGS. 9 and 10) for the hopper, pivoted thereon at 26a. The lid itself mounts pivot elements 27a for a cover 27 enclosing the channel member 4. Such cover has marginal flanges 27b which rest upon ears 27c projecting from the upper extension 8 of the rear wall of the hopper.

The pivot elements 27a are so disposed on said lid, that when it is raised, the channel cover 27 may rise conformingly as shown in dash lines in FIG. 10. The details of the machine have been omitted in FIGS. 9 and 10, as they are intended only to illustrate the lid 26 and cover 27.

By locating the conveyor as described and shown in exterior proximity to a wall of the hopper, there is avoided any reduction by the conveyor of hopper capacity, and the resistance offered by hopper contents is minimized.

It will be appreciated that there may be considerable variation in the particular form of the pieces handled by the described machine, the main requisites being an elongation of such pieces and their substantial uniformity.

Upon their gravitational discharge from the upper end of the conveyor, the workpieces may be received by any desired delivery mechanism, as, for example, an orienting apparatus such as disclosed by my Patent 2,930,473, hereinbefore mentioned.

What I claim is:

1. In a mechanism for continuously upwardly delivering substantially identical elongated workpieces from a supply source, the combination with a hopper forming said supply source and having a fill opening and a rear wall and a bottom inclined downwardly toward such wall, of an elongated flexible endless conveyor having an upwardly traveling span adjoined and substantially parallel to and upwardly extending beyond said wall, a revoluble upper mounting for the conveyor, a revoluble lower mounting for the conveyor, drive means for the conveyor, a plurality of workpiece pick-up devices mounted upon the conveyor, each such device comprising a shelf elongated transversely to the direction of conveyor travel, and a plurality of laterally spaced lugs forwardly projecting from the conveyor and upwardly spaced from said shelf.

2. In a mechanism as set forth in claim 1, said conveyor being formed of an endless succession of pivotally joined links, said pick-up devices each including a succession of three links, said shelf being attached to the lowest of the links in upward travel of the conveyor, a flat plate being fixed to the middle link to avoid engagement therein of any workpiece, and said lugs being rigidly extended from the uppermost link, whereby an elongated workpiece may be carried lying longitudinally upon said shelf, or across said projecting lugs, or having a lower end supported by said shelf, and its upper end portion supported by said lugs.

3. In a mechanism as set forth in claim 2, said hopper being formed with an opening at the juncture of its bottom and rear wall, said conveyor traveling upwardly through said opening to present said pick-up devices to the contents of said hopper, a housing disposed beneath and substantially obstructing said opening, and adapted to admit the upwardly traveling pick-up devices and prevent downward escape through said opening of the hopper contents.

4. In a mechanism as set forth in claim 3, said housing presenting to said conveyor a surface approximately arcuate about the axis of the lower revoluble mounting, said surface being spaced from the conveyor to afford passage of said shelves and being formed with channels to afford passage of said lugs, the arcuate extent of said surface being such that as one of said shelves emerges from the housing into said hopper, the succeeding shelf enters said housing, whereby any workpieces falling into said housing between said lugs is engaged by and carried upwardly by said last mentioned shelf.

5. In a mechanism for continuously upwardly delivering substantially identical elongated workpieces from a supply source, the combination with such source of an endless flexible conveyor, revoluble mountings supporting said conveyor, means for driving said conveyor, said conveyor including a plurality of work pick-up devices spaced apart in direction of conveyor travel, each device comprising a shelf mounted upon the conveyor and elongated transversely to direction of conveyor travel, and a plurality of laterally spaced lugs fixed upon the conveyor and projecting therefrom above said shelf, whereby an elongated workpiece may be carried lying longitudinally upon said shelf, or across said projecting lugs, or having a lower end supported by said shelf and its upper end portion supported by said lugs.

6. In a mechanism for continuously upwardly delivering materials from a supply source, the combination with a hopper forming said supply source and having a fill opening at its top and having a rear end wall, a pedestal extending upwardly from said end wall, including an upward extension of said wall, an elongated flexible endless conveyor having an upwardly traveling span adjoining said wall and its extension, of a lid surmounting said hopper, means on the rear wall pivotally mounting said lid, a cover enclosing said extension of the end wall and adjoining portion of the conveyor, and means on said lid pivotally mounting said cover thereon, whereby said lid may be pivotally raised to give access to the hopper and leave said cover substantially in its use position.

7. In a mechanism for continuously upwardly delivering materials from a supply source, the combination with a hopper forming said supply source and having a fill opening at its top and having a rear wall, an elongated flexible endless conveyor having an upwardly traveling span adjoining said wall and comprising pick-up devices confronting the materials in the hopper, said conveyor span having a portion upwardly extending beyond the hopper, a lid for covering or uncovering said fill opening, means for pivoting said lid upon the hopper in proximity to said rear wall to swing between hopper-covering positions, and uncovering positions, a cover for said upwardly extending portion of the conveyor span, and means pivoting the cover on said lid to swing up and down about an axis substantially parallel to the pivot axis of the lid.

References Cited in the file of this patent

UNITED STATES PATENTS

| | | |
|---|---|---|
| 582,988 | Hoyte | May 18, 1897 |
| 2,649,214 | Kirby | Aug. 18, 1953 |